Oct. 15, 1957 W. A. ALLEN 2,809,498
ICE CREAM MAKING APPARATUS
Filed Aug. 1, 1955
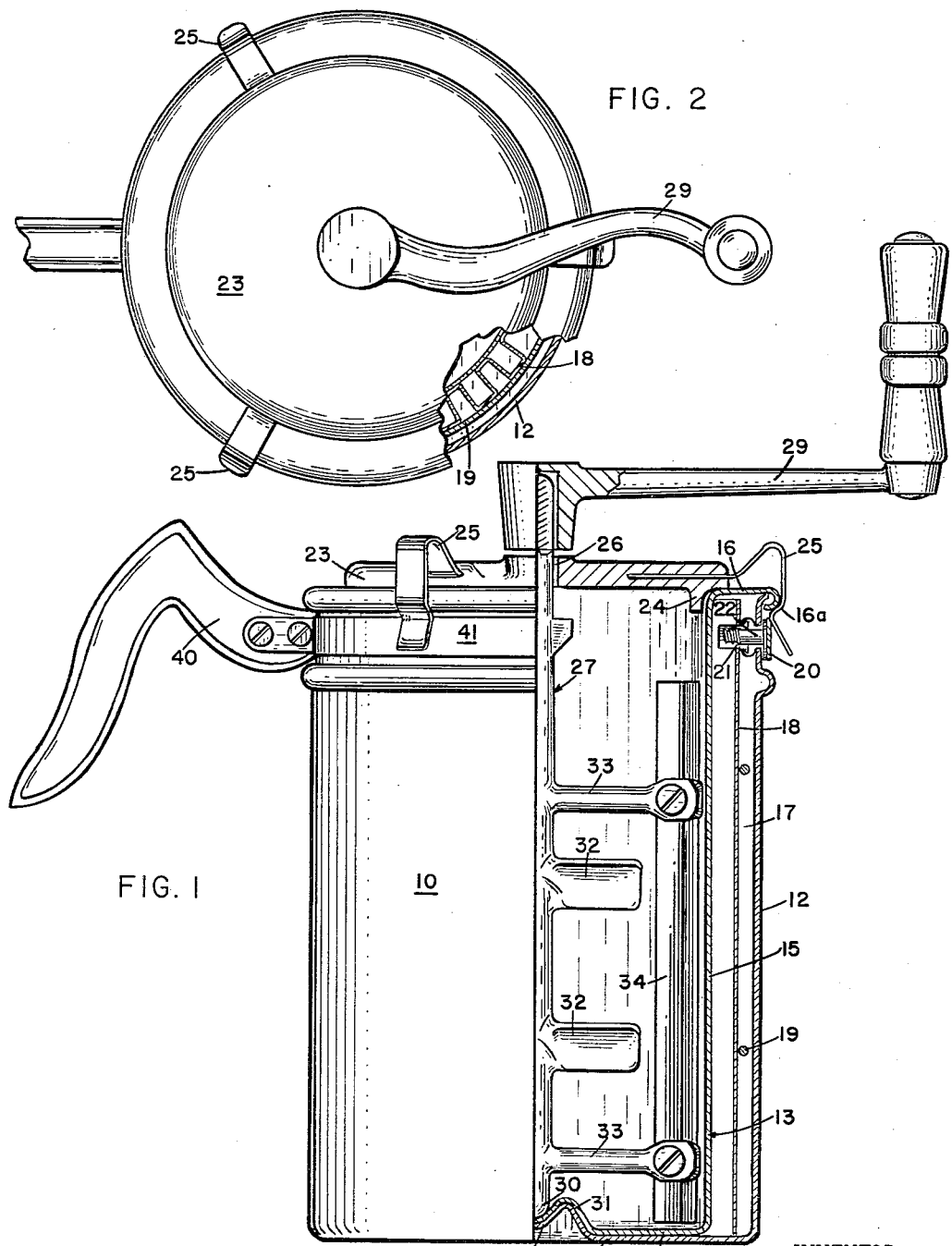
INVENTOR.
WILLIAM A. ALLEN
BY
*Herman Seid*
ATTORNEY United States Patent Office 2,809,498
Patented Oct. 15, 1957

2,809,498
ICE CREAM MAKING APPARATUS
William A. Allen, Syracuse, N. Y., assignor to Carrier Corporation, Syracuse, N. Y., a corporation of Delaware Application August 1, 1955, Serial No. 525,611
3 Claims. (Cl. 62—79)

This invention relates generally to ice cream making apparatus and more particularly to ice cream making apparatus wherein a salt solution, having a relatively low freezing temperature with respect to that of water, extracts heat from a liquid ice cream mix to form ice cream in a substantially solid state, when an exchange of heat between the colder salt solution and the warmer ice cream mix occurs.

Apparatus of this general type has been known in the past; however, this invention has for its chief object the provision of ice cream making apparatus of the type mentioned above wherein the solution employed has a freezing point or eutectic temperature of about 0.6° F. Use of a salt solution having a freezing point of the value mentioned above permits the ice cream making apparatus to be placed in a domestic type freezer in order to freeze the solution preparatory to making ice cream. After the salt solution has been frozen the ice cream making unit is withdrawn from the freezer and ice cream mix in liquid form, the constituents of which are well known to those interested in the production of ice cream, is introduced into the apparatus. As the ice cream solution is agitated within an inner container the salt solution, located in a chamber between the inner and an outer container, extracts heat from the ice cream mix, causing the latter to congeal and form ice cream acceptable for consumption.

Another object of this invention involves a provision of an improved ice cream making apparatus wherein an inner container is assembled within an outer container so that the two bottom walls of each container are contiguous and the side walls extending upwardly therefrom, are in spaced relation, to form a chamber. Preferably, the side wall of the inner container is slightly longer than the side wall of the outer container so that it may be rolled over and engage the outer container to close the above mentioned chamber. Before the two containers have been assembled in the manner described above, a metal forming operation involving the formation of an annular ridge in the bottom walls of the two containers is performed. The annular ridge defines a lower bearing surface for a dasher member having a series of blades extending from a generally vertical shaft and an end portion, remote from the bearing, adapted to project through an opening in a closure member applied to the upper or open end of the assembled container. In order to expedite a transfer of heat from the ice cream mix within the inner container to the salt solution contained in the chamber formed by the side walls of the inner and outer containers, a heat transfer member in the form of a corrugated band is assembled about the outer surface of the inner container and maintained thereagainst by virtue of two spaced confining bands. Other advantages and objects of the invention will be obvious upon a consideration of the ensuing description of a preferred embodiment of my invention.

Figure 1 illustrates an ice cream making unit constructed in accordance with my invention. The unit is shown partly in elevation and partly in section; and Figure 2 is a plan view of the unit illustrated in Figure 1 with certain parts thereof broken away in the interest of clarity.

Referring more particularly to the drawings for a description of one embodiment of the invention, it will be noted that 10 represents an outer can or container. The can 10 consists of a bottom wall 11 and a side wall 12 integrally formed therewith and extending vertically upward therefrom in the manner shown in Figure 1. The bottom wall 11 includes the central portion 11a formed in a manner to be more particularly described later.

An inner or ice cream containing can is assembled within the outer can in the manner shown in Figure 1. The inner can 13 includes a bottom wall 14 connected to the bottom wall of the outer can 10, preferably through an adhesive bonding agent. Side walls 15 extend upwardly from the bottom wall and include an outer peripheral portion 16 bent over substantially at right angles to the side wall and provided with a hooked extremity 16a for the purpose of engaging the end of the side wall of the outer can. It will thus be evident that a chamber 17 is formed between the side walls of the inner and outer cans.

The chamber 17 accommodates a salt solution having a low freezing point. The particular solution which I prefer to employ will be discussed later. The general purpose of the solution employed is to extract an amount of heat from the ice cream mix in the inner can sufficient to cool the mix to its freezing point or slightly below. In order to facilitate the exchange of transfer of heat involved, a heat exchange element 18 is disposed within the chamber as shown in Figure 1. The heat exchange element is maintained in tight relation with the outer surface of the can through the confining bands 19. An opening 20 is provided in the side wall of the outer can.

The purpose of the opening 20 is to permit the introduction into the chamber 17 of the salt solution serving as the heat absorption means during the ice cream making process. As shown in Figure 1 a conventional blind rivet seals the opening once the solution has been introduced into the chamber in the manner mentioned above. Provision may be made in the corrugated heat exchange member 18 to accommodate the end of the rivet, or the opening 20 may be located so that the inner end of the rivet projects between successive corrugations of member 18.

A closure member 23 in the form of a cover of a substantially circular configuration closes the upper end of the inner can in the manner shown in Figure 1. The cover member is provided, on the under surface thereof, with a depending annular rim 24 spaced from the marginal edge of the cover to form a shoulder adapted to be supported by that portion 16 of the inner can bent outwardly from the side wall thereof. To assist in preventing separation of the member 23 from the can, the cover member is provided with a series of circumferentially spaced clips 25 assembled in the cover member in the manner shown in Figure 1 and being provided with an end portion of a configuration adapted to snap over the end portion 16a of the inner can wall member. The cover member is also provided with an opening 26 extending therethrough. This opening permits one end of a dasher member 27 to project therethrough for connection with an operating member in the form of a crank and handle assembly 29. The dasher member has a substantially vertical shaft portion with an end 30 remote from that end projecting through the top cover, adapted to be supported in the bearing portion of the inner can defined by the annular ridge 31.

As pointed out above the bottom walls of the inner and outer cans are subjected to a metal forming operation wherein the central portion 11a of the outer can and the portion of the inner can overlying the central portion are displaced from the plane of the bottom walls. The displaced portions form an annular ridge 31 surrounding a dasher engaging depression having an elevation above the plane of the bottom walls but below the ridge, so that a section through the deformed portion has an undulating appearance. The dasher member includes a series of vanes 32 integrally secured to the shaft portion thereof intermediate the ends. These vanes are diposed at an angle to the central axis of the shaft. In addition to the vanes, arms 33 also project from the shaft at spaced portions thereof and support a blade member 34. It will be appreciated that the dasher member includes in addition to the structure shown in Figure 1 in the full lines, vanes and arms as well as another blade extending in a direction opposite to that which the arms and blade extend in the view shown. In other words, Figure 1 illustrates only half of the actual dasher construction.

To facilitate handling of the ice cream making apparatus a container handle 40 is shown connected to the unattached ends of an encircling band member 41. While manual means are shown for manipulating the agitating dasher member, it will be appreciated that the portion of the dasher member extending above the cover may receive a flexible shaft of the type designel to transmit the motion of a motor. Other arrangements for providing rotary motion to the dasher member will suggest themselves to those skilled in the art.

As pointed out above, one of the principal objects of the invention involves the selection of a salt solution, for use in the chamber 17, having a freezing point within the range of air temperatures, as determined by evaporator temperatures, found in the domestic food freezers of the type finding wide-spread use. Normally the temperature range under consideration will be in the order of $-5°$ F. to $+10°$ F. In addition to having a freezing point of the value mentioned above, it is also desirable that the solution employed have a favorable heat of solution. In other words, it is desirable that the solution chosen have a favorable latent heat of fusion as well as a favorable heat of solution. This permits the extraction, by the solution in chamber 17, of a considerable degree of heat from the solution or ice cream mix disposed within the inner container 13. In carrying out the objects of this invention, I have found that a eutectic solution, as for illustration sodium nitrate, will provide the desired result. The salt solution used should include a solution wherein the salt, sodium nitrate, forms about 40% of the solution. In addition to the favorable heat of solution characteristic, the sodium nitrate solution is non-toxic and is relatively inexpensive.

Considering the operation of the device forming one embodiment of my invention the ice cream making apparatus disclosed is placed in the freezing compartment of a freezing unit wherein the temperature of the air in the freezing compartment is maintained at about 0° F. Under these circumstances the salt solution present in the chamber 17 freezes. Once this solution is in the frozen state the unit may be removed from the freezer compartment, the ice cream mix, formed of constituents well known to those skilled in the art, introduced into the inner container, the cover supplied to the unit in the manner described above and the dasher member rotated. Preferably, the ice cream mix, in liquid form, is maintained at a temperature of about 40° F. prior to its introduction into the inner can. Once the mix has been introduced into the inner can, an exchange of heat between the salt solution in chamber 17 and the ice cream mix occurs. In this instance heat flows from the warmer medium, namely the ice cream mix, to the colder medium, namely the salt solution. Under these conditions the wall 15 of the inner can acts as a heat transfer agent and the heat exchange member 18 serves to expedite the flow of heat. The heat absorbed by the salt solution causes the solution to change state and become liquid while the heat extracted from the ice cream solution causes the temperature thereof to fall to a point where the ice cream becomes congealed. The function of the agitator or dasher is to introduce quantities of air into the mix as it freezes in order to enhance the taste and texture of the ice cream. With the arrangement disclosed, wherein ice cream is formed in an atmosphere in the vicinity of 0° F., a product having highly desirable characteristics as far as taste and texture is concerned, is made. The size of ice crystals that may be formed in the ice cream is maintained at a minimum due primarily to two conditions, the first of which is the formation of the ice cream in a solid state in a short period of time due to the presence of the low temperature and the second is the mechanical agitation of the ice cream mix during the formation of the solidified or partially solidified product.

Tests made with the device as described above indicate that a favorable quality of ice cream may be made by using the elements described above and agitating the ice cream mix for a period of about seven minutes.

It will be obvious that other constructions may be utilized to practice the invention without departing from the spirit or scope thereof.

While I have described a preferred embodiment of the invention, it will be understood that the invention is not limited thereto since it may be otherwise embodied within the scope of the following claims.

I claim:

1. Ice cream making apparatus comprising an outer container including a bottom wall and a circumferentially uninterrupted side wall integrally connected thereto; an inner container including a bottom wall contiguous said bottom wall of the first container, and a circumferentially uninterrupted side wall extending within the side wall of the first container and in spaced relation thereto, said inner container having the marginal ends of the side walls thereof bent outwardly to engage the upper ends of the wall of said outer container to form a chamber between the containers, said outer container being provided with an access opening for said chamber; a closure member having an opening therein; a mixing member mounted in said opening and including a portion projecting into the confines of the inner container and a handle engaging portion extending upwardly from said closure member, a heat transfer member positioned in said chamber in heat exchange relation with the wall of the inner container, said bottom walls of the container being deformed to provide a pocket-like bearing for the mixing member, a quantity of a eutectic solution in said chamber, said solution having a freezing point below that of the ice cream so that heat in an amount sufficient to cause ice cream mix within the inner container to congeal may be absorbed by the solution.

2. The invention described in claim 1 wherein said eutectic solution has a freezing point within the temperature range of $-5°$ F. to $+10°$ F.

3. Ice cream making apparatus comprising an outer container including a bottom wall and a circumferentially uninterrupted side; an inner container including a bottom wall contiguous said bottom wall of the first container and a circumferentially uninterrupted side wall extending in spaced relation to said side wall of said outer container to form a chamber therewith, portions of the contiguous bottom walls of said containers being formed out of the plane thereof to define a bearing surface; a closure member for said chamber having an opening therein, and means for mixing material in said inner container, said mixing means having a first portion extending through said opening in said closure member and an end portion engaging said bearing surface.

References Cited in the file of this patent

UNITED STATES PATENTS

| | | |
|---|---|---|
| 1,791,041 | Sawyer | Feb. 3, 1931 |
| 1,957,313 | Bichowsky et al. | May 1, 1934 |
| 1,978,176 | Steenstrup | Oct. 23, 1934 |
| 2,491,952 | Calmes | Dec. 20, 1949 |